(12) United States Patent
Minemura et al.

(10) Patent No.: US 10,861,337 B2
(45) Date of Patent: Dec. 8, 2020

(54) VEHICLE CONTROL APPARATUS AND VEHICLE CONTROL METHOD (71) Applicants: DENSO CORPORATION, Kariya (JP); TOYOTA JIDOSHA KABUSHIKI KAISHA, Toyota (JP)

(72) Inventors: Akitoshi Minemura, Kariya (JP); Jun Tsuchida, Okazaki (JP); Masayuki Shimizu, Numazu (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 15/562,225

(22) PCT Filed: Mar. 24, 2016

(86) PCT No.: PCT/JP2016/059294
§ 371 (c)(1),
(2) Date: Sep. 27, 2017

(87) PCT Pub. No.: WO2016/158634
PCT Pub. Date: Oct. 6, 2016

(65) Prior Publication Data
US 2018/0122242 A1   May 3, 2018

(30) Foreign Application Priority Data

Mar. 31, 2015   (JP) .................... 2015-072923

(51) Int. Cl.
*G08G 1/16* (2006.01)
*B60W 30/09* (2012.01)
(Continued)

(52) U.S. Cl.
CPC ............. *G08G 1/166* (2013.01); *B60Q 9/008* (2013.01); *B60T 7/22* (2013.01); *B60W 30/09* (2013.01);
(Continued)

(58) Field of Classification Search
CPC .................................................. B60R 21/0136
See application file for complete search history.

(56) References Cited

U.S. PATENT DOCUMENTS

2007/0109110 A1 *  5/2007  Ohmura ............. B60R 21/0134
                                                340/435
2009/0248270 A1 * 10/2009  Sekiguchi ............. G08G 1/166
                                                701/96

(Continued)

FOREIGN PATENT DOCUMENTS

JP    H10-267695 A   10/1998
JP    2010-18230 A    1/2010
(Continued)

*Primary Examiner* — Imran K Mustafa
(74) *Attorney, Agent, or Firm* — Maschoff Brennan (57) ABSTRACT

A vehicle control apparatus activates a safety device for avoiding a collision of an own vehicle with a target or reducing damage caused by the collision. The vehicle control apparatus sets an activation condition for the safety device. The vehicle control apparatus determines whether each of a plurality of correction conditions for the activation condition is satisfied. The vehicle control apparatus determines whether to activate the safety device on the basis of the activation condition. The vehicle control apparatus sets the activation condition by correcting a reference condition on the basis of a correction value for a satisfied correction condition, and correcting the corrected reference condition on the basis of a correction value (destination correction value) for each destination.

13 Claims, 6 Drawing Sheets

(51) Int. Cl.
  *G01S 13/931*  (2020.01)
  *G01S 13/86*  (2006.01)
  *B60Q 9/00*  (2006.01)
  *B60T 7/22*  (2006.01)
  *B62D 15/02*  (2006.01)

(52) U.S. Cl.
  CPC .......... *G01S 13/867* (2013.01); *G01S 13/931* (2013.01); *G08G 1/165* (2013.01); *B60T 2201/022* (2013.01); *B62D 15/0265* (2013.01); *G01S 2013/932* (2020.01); *G01S 2013/9318* (2020.01); *G01S 2013/93185* (2020.01)

(56) References Cited

U.S. PATENT DOCUMENTS

| | | | |
|---|---|---|---|
| 2011/0205042 A1 | 8/2011 | Takemura et al. | |
| 2012/0133738 A1* | 5/2012 | Hoffmeier | G08G 1/164 348/46 |
| 2012/0143488 A1* | 6/2012 | Othmezouri | G06K 9/00798 701/301 |
| 2014/0343749 A1 | 11/2014 | Minemura et al. | |

FOREIGN PATENT DOCUMENTS

| | | |
|---|---|---|
| JP | 2012-131466 | 7/2012 |
| JP | 2014-222463 A | 11/2014 |
| WO | 2010/038851 A | 4/2010 |

* cited by examiner

| | | BASE VALUE | FIRST CORRECTION CONDITION | SECOND CORRECTION CONDITION | ... |
|---|---|---|---|---|---|
| PRECEDING VEHICLE | ALARM | BASE VALUE R11 | A11 | B11 | ... |
| | BRAKE ASSIST | BASE VALUE R12 | A12 | B12 | ... |
| | AUTOMATIC BRAKE | BASE VALUE R13 | A13 | B13 | ... |
| STATIONARY VEHICLE | ALARM | BASE VALUE R21 | A21 | B21 | ... |
| | BRAKE ASSIST | BASE VALUE R22 | A22 | B22 | ... |
| | AUTOMATIC BRAKE | BASE VALUE R23 | A23 | B23 | ... |
| ⋮ | ⋮ | ⋮ | ⋮ | ⋮ | ⋮ |

FIG.4

| | | | |
|---|---|---|---|
| FIRST DESTINATION | PRECEDING VEHICLE | ALARM | $\alpha 11$ |
| | | BRAKE ASSIST | $\alpha 12$ |
| | | AUTOMATIC BRAKE | $\alpha 13$ |
| | STATIONARY VEHICLE | ALARM | $\alpha 21$ |
| | | BRAKE ASSIST | $\alpha 22$ |
| | | AUTOMATIC BRAKE | $\alpha 23$ |
| | ⋮ | ⋮ | ⋮ |
| SECOND DESTINATION | PRECEDING VEHICLE | ALARM | $\beta 11$ |
| | | BRAKE ASSIST | $\beta 12$ |
| | | AUTOMATIC BRAKE | $\beta 13$ |
| | STATIONARY VEHICLE | ALARM | $\beta 21$ |
| | | BRAKE ASSIST | $\beta 22$ |
| | | AUTOMATIC BRAKE | $\beta 23$ |
| | ⋮ | ⋮ | ⋮ |
| ⋮ | ⋮ | | |

| | | | BASE VALUE | FIRST CORRECTION CONDITION | SECOND CORRECTION CONDITION | ... |
|---|---|---|---|---|---|---|
| ALARM | PRECEDING VEHICLE | FIRST DESTINATION | BASE VALUE X11 | A11 | B11 | ... |
| | | SECOND DESTINATION | BASE VALUE Y11 | | | ... |
| | | ⋮ | ⋮ | | | |
| | STATIONARY VEHICLE | FIRST DESTINATION | BASE VALUE X12 | A12 | B12 | ... |
| | | SECOND DESTINATION | BASE VALUE Y12 | | | ... |
| | | ⋮ | ⋮ | | | ... |
| ⋮ | ⋮ | ⋮ | ⋮ | ⋮ | ⋮ | ⋮ |
| BRAKE ASSIST | PRECEDING VEHICLE | FIRST DESTINATION | BASE VALUE X21 | A21 | B21 | ... |
| | | SECOND DESTINATION | BASE VALUE Y21 | | | ... |
| | | ⋮ | ⋮ | | | |
| | STATIONARY VEHICLE | FIRST DESTINATION | BASE VALUE X22 | A22 | B22 | ... |
| | | SECOND DESTINATION | BASE VALUE Y22 | | | ... |
| | | ⋮ | ⋮ | | | ... |
| ⋮ | ⋮ | ⋮ | ⋮ | ⋮ | ⋮ | ⋮ |
| ⋮ | | | ⋮ | | | |

VEHICLE CONTROL APPARATUS AND VEHICLE CONTROL METHOD

CROSS-REFERENCE TO RELATED APPLICATION

This application is based on and claims the benefit of priority from earlier Japanese Patent Application No. 2015-072923 filed on Mar. 31, 2015, the description of which is incorporated herein by reference.

TECHNICAL FIELD

The present disclosure relates to a vehicle control technique for activating a safety device provided in the own vehicle if there is a probability that the own vehicle will collide with a target which is located around the own vehicle such as in the traveling direction of the own vehicle.

BACKGROUND ART

Pre-crash safety (PCS) that has been put into practice reduces or prevents a collision between the own vehicle and a target, such as another vehicle, a pedestrian, or a road structure, which is located in the traveling direction of the own vehicle. According to PCS, time to collision (TTC), that is, predicted time taken before the own vehicle collides with a target, is calculated on the basis of a relative distance between the own vehicle and the target, and a relative speed or a relative acceleration between the own vehicle and the target. According to the PCS, based on the calculated time to collision, the driver of the own vehicle is notified by a notification device or the like of the fact that the own vehicle is approaching the target, or the braking device of the own vehicle is activated.

According to a vehicle control apparatus practically using the PCS, settings generally need to be changed according to the country, region, or the like where the vehicle is used. For example, PTL 1 discloses a vehicle display device which is adaptable to individual countries or regions. According to the vehicle display device of PTL 1, different display items are selected and displayed on a display panel in conformity with the laws, regulations, and the like of the individual countries.

CITATION LIST

Patent Literature

[PTL 1] JP H10-267695 A

SUMMARY OF THE INVENTION

Technical Problem

According to the PCS, various conditions such as the traveling state of the own vehicle and the positional relationship between the own vehicle and a target need to be taken into account to appropriately activate the safety device. Therefore, settings of such various conditions for individual countries or regions cause a problem of increasing the amount of data regarding activation of the safety device.

An object of the present disclosure is to provide a vehicle control apparatus and a vehicle control method for reducing the amount of data relating to activation of a safety device, which are set to appropriately activate the safety device in conformity with the country, region, or the like.

Solution to Problem

A first vehicle control apparatus according to the present disclosure activates a safety device for avoiding a collision of the own vehicle with a target present around the own vehicle or reducing damage caused by the collision, in the case where there is a probability that the own vehicle will collide with the target. The vehicle control apparatus includes a condition setting means, a correction determination means, and an activation determination means. The condition setting means sets an activation condition for activating the safety device. The correction determination means determines whether each of a plurality of correction conditions for the activation condition is satisfied. The activation determination means determines whether to activate the safety device, on the basis of the activation condition. In the vehicle control apparatus, the condition setting means sets the activation condition by correcting a predetermined reference condition on the basis of a correction value for a correction condition which has been determined by the correction determination means as being satisfied, and correcting the corrected reference condition on the basis of a destination correction value determined for each destination corresponding to a country or region where the own vehicle is used.

With the aforementioned configuration, a plurality of correction conditions are set for the activation condition for the safety device, and a correction value is set for each of the plurality of correction conditions. This allows the vehicle control apparatus of the present disclosure to finely set the activation condition and accurately activate the safety device. In the case where a correction value corresponding to each correction condition is set for each destination, the amount of data is increased. Thus, with the aforementioned configuration, the reference condition is corrected on the basis of each correction condition, and the corrected reference condition is corrected on the basis of the destination correction value determined for each destination. This allows the vehicle control apparatus of the present disclosure to finely set the activation condition for the safety device and suppress increase in the amount of data regarding the activation of the safety device.

A second vehicle control apparatus according to the present disclosure is a vehicle control apparatus which activates a safety device for avoiding a collision of an own vehicle with a target that is present around the own vehicle or reducing damage caused by the collision, in the case where there is a probability that the own vehicle will collide with the target. The vehicle control apparatus includes a condition setting means, a correction determination means, and an activation determination means. The condition setting means sets an activation condition for activating the safety device. The correction determination means determines whether each of a plurality of correction conditions for the activation condition is satisfied. The activation determination means determines whether to activate the safety device, on the basis of the activation condition. In the vehicle control apparatus, the condition setting means sets the activation condition by correcting a reference condition on the basis of the correction condition which has been determined by the correction determination means as being satisfied, the reference condition being determined for each destination corresponding to a country or region where the own vehicle is used.

With the aforementioned configuration, a reference condition set for each destination is corrected on the basis of a correction condition. This allows the vehicle control apparatus of the present disclosure to finely set the activation condition for the safety device and suppress increase in the amount of data regarding the activation of the safety device.

DESCRIPTION OF THE EMBODIMENTS

With reference to the drawings, the following description will discuss some embodiments. In the following embodiments, the same or equivalent components are given the same reference signs in the drawings, and for the components with the same reference signs, descriptions of the components should be referred to.

First Embodiment

A vehicle control apparatus of the present embodiment is installed in a vehicle (own vehicle) and detects a target which is present around the own vehicle such as in a traveling direction of the own vehicle. The vehicle control apparatus performs control for avoiding a collision between a detected target and the own vehicle or reducing damage caused by the collision by performing a vehicle control process (vehicle control method) described later. Thus, the vehicle control apparatus of the present embodiment serves as a PCS system.

Figure 1:
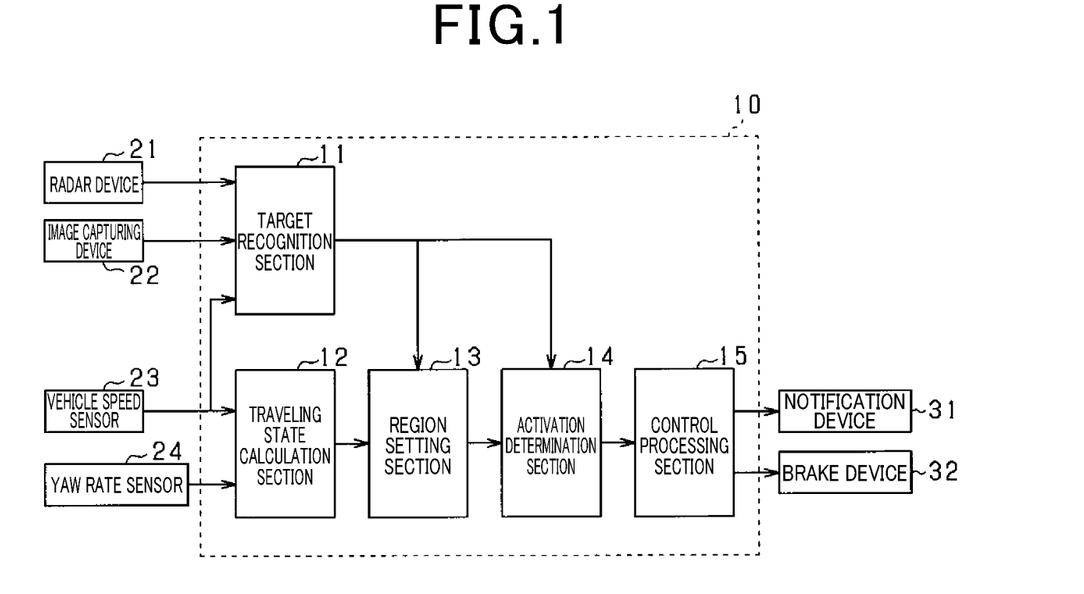
FIG. 1 is a configuration diagram illustrating a vehicle control apparatus.

FIG. 1 illustrates an example configuration of the vehicle control apparatus of the present embodiment. As illustrated in FIG. 1, a vehicle control ECU 10, which is the vehicle control apparatus, is a computer including a CPU, a memory (e.g., ROM and RAM), I/O and the like. The vehicle control ECU 10 has functions of a target recognition section 11, a traveling state calculation section 12, a region setting section 13, an activation determination section 14, and a control processing section 15. According to the vehicle control ECU 10, the CPU executes, for example, a program installed in the ROM so that each of the functions is realized.

The vehicle control ECU 10 is connected to sensor devices which input various types of data item. Examples of the sensor devices to be connected to the vehicle control ECU 10 include a radar device 21, an image capturing device 22, a vehicle speed sensor 23, and a yaw rate sensor 24.

The radar device 21 is, for example, a millimeter wave radar which transmits, as probe waves, a high frequency signal in a millimeter wave band. The radar device 21 is provided to a front end of the own vehicle. The radar device 21 sets, as a detectable region for a target, a region extending over a predetermined angular range, and detects the position of a target in the detectable region. Specifically, the radar device 21 transmits probe waves at a predetermined control cycle and receives reflected waves via a plurality of antennas. Based on a transmission time of the probe waves and a reception time of the reflected waves, the radar device 21 calculates a distance to the target which has reflected the probe waves. The reflected waves reflected by the target have a frequency that changes due to Doppler effect. Accordingly, based on the frequency of the reflected waves that has changed, the radar device 21 calculates a speed relative to the target which has reflected the probe waves. Based on a phase difference of the reflected waves received via the plurality of antenna, the radar device 21 further calculates an azimuth of the target which has reflected the probe waves. In the case where the position and the azimuth of the target can be calculated, the position of the target relative to the own vehicle can be specified. The radar device 21 cyclically transmits probe waves, receives reflected waves, and calculates a position and a speed of the target relative to the own vehicle. The radar device 21 then transmits the calculated relative position and relative speed per unit time, to the vehicle control ECU 10.

The image capturing device 22 is, for example, a CCD camera, a CMOS image sensor, a near infrared camera, or the like. The image capturing device 22 is provided at a predetermined level at the center of the width direction of the own vehicle. The image capturing device 22 captures, from a bird's-eye view, an image of a region extending over a predetermined angular range ahead of the own vehicle. From the captured image, the image capturing device 22 extracts a characteristic point indicating the presence of a target. Specifically, the image capturing device 22 extracts an edge point on the basis of brightness data item of the captured image, and performs a Hough Transform with respect to the edge point thus extracted. In a Hough Transform, for example, a point on a straight line along which a plurality of edge points are continuously arranged, or a point at which straight lines intersect with each other is extracted as a characteristic point. The image capturing device 22 captures an image and extracts a characteristic point for each control cycle which is the same as or different from that of the radar device 21. The image capturing device 22 then transmits a result of the extraction of the characteristic point to the vehicle control ECU 10.

The vehicle speed sensor 23 is provided to a rotary shaft which transmits motive power to wheels of the own vehicle. The vehicle speed sensor 23 detects a speed of the own vehicle on the basis of the number of rotations of the rotary shaft. The vehicle speed sensor 23 then transmits a result of the detection of the speed to the vehicle control ECU 10.

The yaw rate sensor 24 detects, as a yaw rate, a rotational angular velocity around a vertical line passing through a centroid of the own vehicle. Accordingly, in the case where the own vehicle is traveling straight, the detection value of the yaw rate is zero. Thus, a turning direction (left or right direction in Which the own vehicle has turned) of the own vehicle can be determined based on a positive/negative sign (a sign indicating a displacement direction of the yaw rate) of the detection value.

The own vehicle includes a notification device 31, a brake device 32, and the like as various safety devices each of which is driven by a control command provided from the vehicle control ECU 10.

The notification device 31 is, for example, a loudspeaker, a display, or the like which is provided inside the cabin of the own vehicle. In the case where the vehicle control ECU 10 determines that there is a risk that the own vehicle will collide with a target, the notification device 31 notifies the driver of the collision risk by outputting an alarm sound, an alarm message, or the like on the basis of a control command provided from the vehicle control ECU 10.

The brake device 32 applies brakes to the own vehicle. If the vehicle control ECU 10 determines that there is a risk that the own vehicle will collide with a target, the brake device 32 is activated on the basis of a control command provided from the vehicle control ECU 10. Specifically, the brake device 32 increases a braking force which is generated in response to the driver's braking operation, or in the absence of the driver's braking operation, the brake device 32 applies automatic braking. That is, the brake device 32 provides the driver with a brake assist function and an automatic brake function.

The functional part of the vehicle control ECU 10 will be described below. The target recognition section 11 of the present embodiment acquires detection information (result of calculation of a position) as first detection information from the radar device 21. The target recognition section 11 acquires detection information (result of extraction of a characteristic point) as second detection information from the image capturing device 22. The target recognition section 11 then correlates a first position data item which is indicated by the position obtained from the first detection information, with second position data item which is indicated by the characteristic point obtained from the second detection information, in the following manner. The target recognition section 11 correlates data items positioned in the vicinity with each other, as position data items of the same target. If the position indicated by the second position data item is present close to the position indicated by the first position data item, the target may be actually present at the position indicated by the first position data item. The state of achieving such an rate acquisition of a target position with the radar device 21 and the image capturing device 22 is referred to as "fusion state."

The target recognition section 11 performs pattern matching with respect to the target (target for which the first position data item has been correlated with the second position data item) which has been determined to be in the fusion state. Specifically, the target recognition section 11 performs pattern matching with respect to the detection information with use of pattern data that has been prepared in advance for each possible target type. The target recognition section 11 then determines whether the detected target is a vehicle or a pedestrian (passerby) on the basis of the result of the pattern matching, and correlates the result of the determination with the target type. In the present embodiment, a concept of the pedestrian, which is one of the target types, may include a bicycle rider.

Subsequently, the target recognition section 11 correlates the target thus determined, with the position and speed of the target relative to the own vehicle. The relative position to be correlated with the target includes a longitudinal position that is a relative position in the traveling direction of the own vehicle and a lateral position that is a relative position in a direction orthogonal to the traveling direction. Based on the relative position and the relative speed, the target recognition section 11 calculates a longitudinal speed that is a relative speed in the traveling direction of the own vehicle and a lateral speed that is a relative speed in the direction orthogonal to the traveling direction.

The target recognition section 11 further identifies the target type according to the result of the determination of whether the target is a vehicle or a pedestrian and according to the longitudinal speed and the lateral speed.

For example, when the target type is determined to be a vehicle, a vehicle type can be further identified as below. That is, the target recognition section 11 identifies four vehicle types on the basis of the longitudinal speed and the lateral speed. Specifically, the target recognition section 11 identifies a preceding vehicle traveling ahead of the own vehicle in the traveling direction of the own vehicle and an oncoming vehicle traveling ahead of the own vehicle in the traveling direction toward a direction opposite to the traveling direction of the own vehicle (traveling in an opposite lane). Furthermore, the target recognition section 11 identifies a stationary vehicle (a stopped vehicle or a parked vehicle) which stands still ahead of the own vehicle in the traveling direction and a crossing vehicle passing across ahead of the own vehicle in the traveling direction.

If the target type is determined to be a pedestrian, a pedestrian type can be further identified as below. That is, the target recognition section 11 identifies four pedestrian types on the basis of the longitudinal speed and the lateral speed. Specifically, the target recognition section 11 identifies a preceding pedestrian who is walking ahead of the own vehicle in the traveling direction of the own vehicle and an oncoming pedestrian who is walking ahead of the own vehicle in a direction opposite to the traveling direction of the own vehicle. Furthermore, the target recognition section 11 identifies a stationary pedestrian who stands still ahead of the own vehicle in the traveling direction and a crossing pedestrian who is passing across ahead of the own vehicle in the traveling direction.

For a target which has been detected only on the basis of the first detection information, the target type can be further identified as below. That is, the target recognition section 11 identifies four target types on the basis of the longitudinal speed and the lateral speed. Specifically, the target recognition section 11 identifies a preceding target moving ahead of the own vehicle in the traveling direction of the own vehicle and an oncoming target moving ahead of the own vehicle in traveling direction toward a direction opposite to the traveling direction of the own vehicle. Furthermore, the target recognition section 11 identifies a stationary target which stands still ahead of the own vehicle in the traveling direction and a crossing target passing across ahead of the own vehicle in the traveling direction.

The target recognition section 11 functions as type determination means for determining a target type.

The traveling state calculation section 12 of the present embodiment determines whether the own vehicle is turning (whether the own vehicle is in a turning state). The traveling state calculation section 12 acquires a vehicle speed (result of detection of a speed) from the vehicle speed sensor 23. Furthermore, the traveling state calculation section 12 acquires a yaw rate (result of detection of a rotational angular velocity) from the yaw rate sensor 24. Based on the vehicle speed and the yaw rate thus acquired, the traveling state calculation section 12 determines whether the own vehicle is in the straight raveling state, or the turning state (i.e. not in the straight traveling state).

Figure 2:
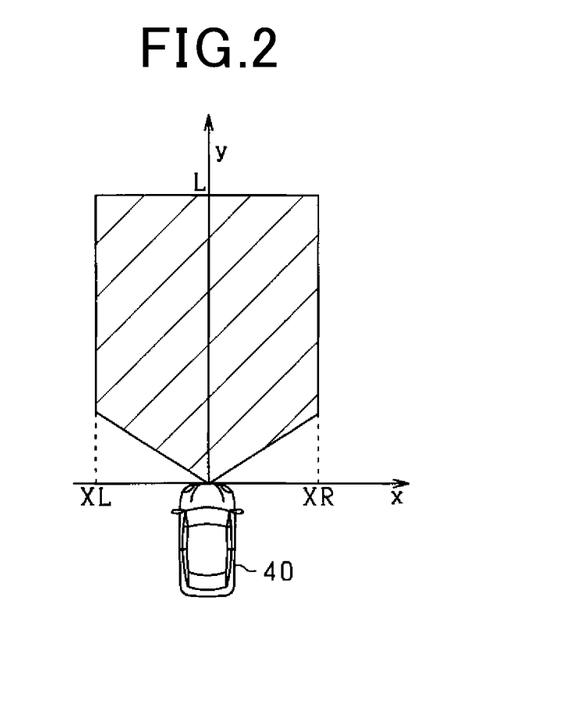
FIG. 2 is a diagram illustrating an activation region for activating a safety device.

With reference to FIG. 2, the following description will discuss the region setting section 13 of the vehicle control ECU 10. FIG. 2 illustrates an example of an activation region for activating a safety device (determination region for determining whether to activate a safety device). For the sake of clarity, FIG. 2 shows an x-axis indicating a position (lateral position) in a lateral direction orthogonal to the traveling direction of an own vehicle 40 and a y-axis indicating a position (longitudinal position) in a longitudinal direction which is the traveling direction. The region setting section 13 of the present embodiment sets, for example, an activation region as illustrated in FIG. 2 (determination region indicated by hatched lines in FIG. 2) ahead of the own vehicle 40, as an activation condition for determining whether o activate the safety device. That is, the region setting section 13 sets an activation condition for activating the safety device. Specifically, the activation region has a predetermined lateral width, which is based on a rightward limit value XR, extending from a center axis of the own vehicle 40 toward the right with respect to the traveling direction of the own vehicle 40. The activation region has a predetermined lateral width, which is based on a leftward limit value XL, extending from the center axis of the own vehicle 40 toward the left with respect to the traveling direction of the own vehicle 40. Furthermore, the activation region has a predetermined longitudinal width (depth), which is based on a forward limit value L (hereinafter referred to as "depth L"), extending in the longitudinal direction that is the traveling direction of the own vehicle 40. The activation region is set for each target type. Furthermore, the activation region for each target type is set for each of functions of the safety device. Of the functions of the safety device, a function to be activated earliest is permitted to have an activation region with a largest width, and a function to be activated latest is permitted to have an activation region with a smallest width. Thus, based on the rightward limit value XR, the leftward limit value XL, and the depth L, the region setting section 13 sets the activation region ahead of the own vehicle 40, for activating the safety device. In this case, the region setting section 13 functions as condition setting means for setting an activation condition for activating the safety device.

The region setting section 13 corrects the activation region which has already been set. The region setting section 13 acquires a position of a target from the target recognition section 11. The region setting section 13 acquires a traveling state of the own vehicle 40 from the traveling state calculation section 12. Based on the position of the target and the traveling state of the own vehicle 40 thus acquired, the region setting section 13 corrects the activation region. Specifically, if the traveling state of the own vehicle 40 is the straight traveling state, the region setting section 13 does not correct the activation region. If the traveling state of the own vehicle 40 is not the straight traveling state (if the traveling state of the own vehicle 40 is the turning state), the region setting section 13 corrects the activation region. If the own vehicle 40 is not in the straight traveling state, the region setting section 13 makes a correction so that the activation region has a smaller width. For example, the region setting section 13 corrects the leftward limit value XL and the rightward limit value XR to a smaller value. This is because if the own vehicle 40 is not in the straight traveling state, accuracy in determination of whether the target is present on a traveling route of the own vehicle 40 decreases. Accordingly, the region setting section 13 suppresses unnecessary activation (activation when not needed) of the safety device by causing the activation region to have a smaller width. To suppress non-activation (activation being disabled when needed) of the safety device with respect to the target, if a target is located rightward of the own vehicle 40, the region setting section 13 corrects the rightward limit value XR to a larger value. If a target is located leftward of the own vehicle 40, the region setting section 13 corrects the leftward limit value XL to a larger value.

The activation determination section 14 of the present embodiment determines whether to activate the safety device. The activation determination section 14 acquires the position of a target from the target recognition section 11. Based on the position of the target thus acquired and the activation region set by the region setting section 13, the activation determination section 14 determines whether to activate the safety device. Specifically, the activation determination section 14 determines whether the target is located in the activation region (whether the position of the target is in the activation region), and based on the result of the determination, the activation determination section 14 determines whether to activate the safety device. Consequently, if the target is located in the activation region (if the position of the target is in the activation region), the activation determination section 14 determines to activate the safety device. If the target is located outside the activation region (if the position of the target is outside the activation region), the activation determination section 14 determines not to activate the safety device. Determining to activate the safety device, the activation determination section 14 transmits the result of the determination (activation determination signal) to the control processing section 15. Receiving the result, the control processing section 15 of the present embodiment transmits a control signal to the safety device to be activated, on the basis of the received result of the determination. This causes the safety device to be activated. Thus, in the vehicle control ECU 10 of the present embodiment, the activation determination section 14 and the control processing section 15 cooperate with each other to serve as activation determination means for determining whether to activate the safety device, on the basis of the activation condition. As described above, the activation region is set for each function of the safety device. Accordingly, the detected target should be located first in the activation region (in the activation region with a largest width) which is set for the function to be activated earliest. Then, as a distance relative to the own vehicle 40 becomes shorter, the position of the target moves from the activation region corresponding to the function to be activated earliest to the activation region corresponding to the function to be activated latest.

Figure 3:
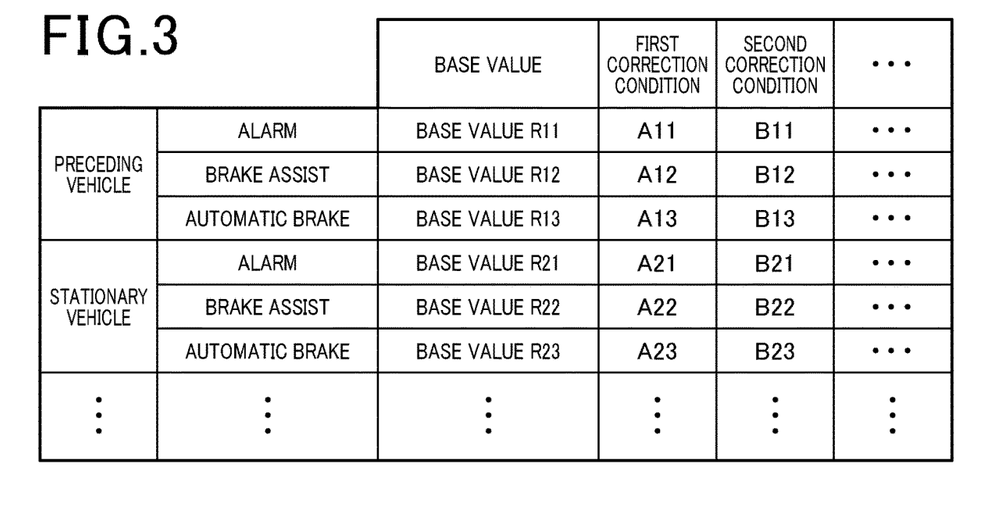
FIG. 3 is a diagram illustrating a data structure of a base value of an activation region and a correction value corresponding to a correction condition, according to a first embodiment.

FIG. 3 shows an example data structure of a base value of the activation region and a correction value for a correction condition in the present embodiment. That is, FIG. 3 is a diagram illustrating a structure of data stored in the memory (e.g., ROM or the like) of the vehicle control ECU 10. As shown in FIG. 3, the data includes a plurality of data items such as target type, function of the safety device, setting criterion for activation region, and correction condition for activation region, and is stored being correlated to each of the plurality of data items. As a data item of the setting criterion for activation region, a base value indicating the setting criterion (reference condition which is a criterion for activation condition)is stored. The base value corresponds to data (a plurality of parameters) indicating a lateral width and a longitudinal width (depth) for setting an activation region (activation condition). Specifically, the base value is the value of the rightward limit value XR, the leftward limit value XL, or the depth L. The base value is stored for each function of the safety device, such as an alarm, brake assist, or automatic brake. Furthermore, the base value of each function is stored for each target type, such as a preceding vehicle or a stationary vehicle.

As a data item of the correction condition for activation region, data corresponding to a plurality of correction conditions, such as a first correction condition and a second correction condition can be stored. As a data item of each correction condition, a correction value corresponding to the correction condition is stored. The correction value is data for correcting the activation region. The correction value is stored for each function of the safety device, and the correction value for each function is stored for each target type. The correction value is data for correcting at least one parameter among the plurality of parameters indicating the lateral width and the longitudinal width (depth) of the activation region. That is, the correction value is data for correcting one of the rightward limit value XR, the leftward limit value XL, and the depth L. The first correction condition of the present embodiment is a condition based on the traveling state of the own vehicle 40, and a correction value corresponding to the first correction condition is a negative value. Specifically, the first correction condition is satisfied if the own vehicle 40 is determined to be in a non-straight traveling state (turning state). That is, if the own vehicle 40 is in a straight traveling state, the correction value for the first correction condition is not used for correcting the activation region. If the own vehicle 40 is in a non-straight traveling state, the correction value for the first correction condition is added to the base value. This causes one of the plurality of parameters indicating the lateral width and the longitudinal width (depth) of the activation region to be corrected to a value smaller than the base value. That is, one of the rightward limit value XR, the leftward limit value XL, and the depth L to be corrected to a value smaller than the base value.

As with the correction value for the first correction condition, a correction value for the second correction condition is stored for each function of the safety device, and the correction value for each function is stored for each target type. The second correction condition of the present embodiment is a condition based on a positional relationship between the own vehicle 40 and the target, and the correction value corresponding to the second correction condition is a positive value. Specifically, the second correction condition is satisfied, for example, if a target is detected in a position in the rightward or leftward direction of the own vehicle 40. That is, if no target is detected in the rightward or leftward direction of the own vehicle 40, the correction value for the second correction condition is not used for correcting the activation region. If a target is detected in a rightward or leftward direction of the own vehicle 40, the correction value for the second correction condition is added to the base value. This causes a parameter (rightward limit value XR or leftward limit Value XL) indicating a rightward lateral width or leftward lateral width of the activation region to be corrected to a value larger than the base value. In this case, the region setting section 13 functions as correction determination means for determining whether each of the plurality of correction conditions for activation region (activation condition)is satisfied. Thus, in the present embodiment, the base value indicating the setting criterion (reference condition) for activation region and the correction value corresponding to a correction condition for activation region are stored being correlated with target type and function of the safety device.

The present embodiment has dealt with the first correction condition and the second correction condition as the correction conditions for activation region, but correction conditions are not limited to this. Various other conditions can be set as the correction conditions. However, the amount of data for the correction value is increased according to the number of correction conditions to be set.

The setting of the base value and the correction value described above needs to be changed according to the country, region, or the like where the vehicle equipped with the vehicle control ECU 10 is used. Specifically, if a plurality of correction values, such as the correction value for the first correction condition and the correction value for the second correction condition, are set so as to be suitable for individual countries, regions, or the like, an enormous amount of data is to be stored.

Figure 4:
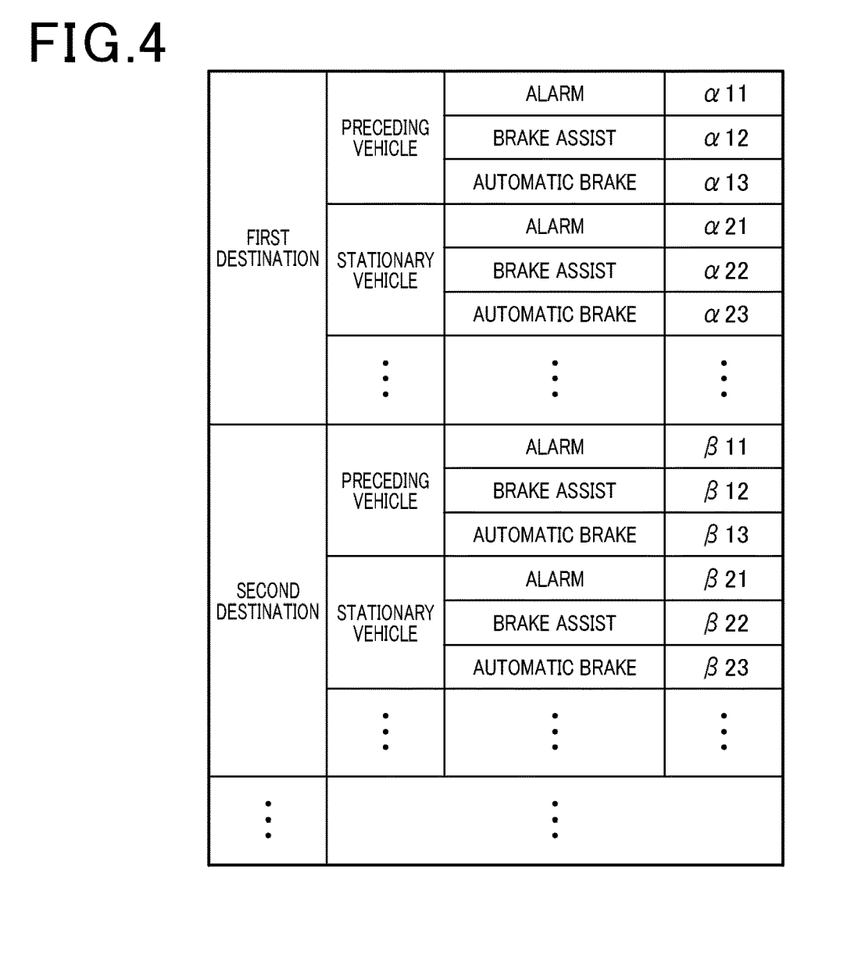
FIG. 4 is a diagram illustrating a data structure of a destination correction value, according to the first embodiment.

Thus, in the present embodiment, a correction value is calculated when the correction value is suitably set for a destination, such as a country or a region. In this case, a destination correction value described below is used. FIG. 4 shows an example data structure of a destination correction value in the present embodiment. Similar to FIG. 3, FIG. 4 is a diagram illustrating a structure of data stored in the memory of the vehicle control ECU 10. As shown in FIG. 4, the data includes a plurality of data items such as destination, target type, function of the safety device, and destination correction, and is stored being correlated to each of the plurality of data items. As a data item of the destination correction, a destination correction value is stored. The destination correction value is stored for each function of the safety device, and the destination correction value for each function is stored for each target type. Furthermore, the destination correction value for each type is stored for each destination. The destination correction value is data for correcting an activation region (corrected reference condition), which has been corrected according to the correction condition, to an activation region appropriate for the destination. That is, the destination correction value is data for correcting one of the rightward limit value XR, the leftward limit value XL, and the depth L, which has been corrected according to the correction condition, to a value appropriate for the destination. A base value which has been corrected with use of the correction value or the like for each of the first correction condition and the second correction condition is multiplied by the destination correction value. That is, the destination correction value is a coefficient by which a base value corrected on the basis of the correction condition is multiplied. Consequently, the activation region which has been corrected on the basis of the correction condition is corrected to a value appropriate for the destination. Depending on the destination, specific functions of the safety device do not have to be necessarily activated, or should not be activated. In this case, the destination correction value is set to zero (coefficient is set to zero). This causes the lateral width and the longitudinal width (depth) of the activation region to be zero, so that the safety device is ensured not to be activated. Similarly, depending on the target type, specific functions of the safety device do not have to be necessarily activated, or should not be activated. Also, in this case, the destination correction value is set to zero. Thus, the function of the safety device is prevented from being activated in a simple manner. Thus, in the present embodiment, the destination correction value for correcting the corrected activation region to a value appropriate for a destination is set being correlated with the destination, the target type and the function of the safety device.

In the present embodiment, a plurality of countries or regions having common road conditions or the like are correlated with a single destination. Accordingly, when a country or a region where the vehicle is used is set, a destination correction value for the destination correlated with the set country, region, or the like is read out.

With reference to FIGS. 3 and 4, the following description will discuss in detail a method for correcting the activation region (activation condition) (correction process performed by the region setting section 13) described above. The following description will discuss an example where an activation region (activation condition) for an alarm function is corrected in the case where the place of destination of the own vehicle 40 is a first destination, a target located in the traveling direction of the own vehicle 40 is a preceding vehicle, and the first and second correction conditions are satisfied. First, based on the target type and the function of the safety device, the region setting section 13 reads out a base value R11 of the setting criterion (reference condition) for activation region, a correction value A11 of the first correction condition, and a correction value B11 of the second correction condition, which correspond to the preceding vehicle and the alarm function. Further, the region setting section 13 reads out a destination correction value α11 corresponding to the preceding vehicle and the alarm function in the first destination of the own vehicle 40, on the basis of the destination, the target type, and the function of the safety device. The region setting section 13 adds the read out correction value A11 for the first correction condition and correction value B11 for the second correction condition to the base value R11. This allows the region setting section 13 to correct a reference activation region corresponding to the target type and the function of the safety device, to an activation region suitable for the traveling state of the own vehicle 40 and the positional relationship between the own vehicle 40 and the target. The region setting section 13 then multiplies the corrected activation region by the destination correction value α11 of the first destination. Accordingly, the region setting section 13 calculates the activation region of the alarm function under the above condition using the following formula (1).

$$\text{Activation region} = (R11 + A11 + B11) \times \alpha 11 \qquad (1)$$

Thus, the region setting section 13 corrects the activation region which has been corrected according to the traveling state of the own vehicle 40 and the positional relationship between the own vehicle 40 and the target, to an activation region appropriate for the country, region, or the like where the own vehicle 40 is used.

Figure 5:
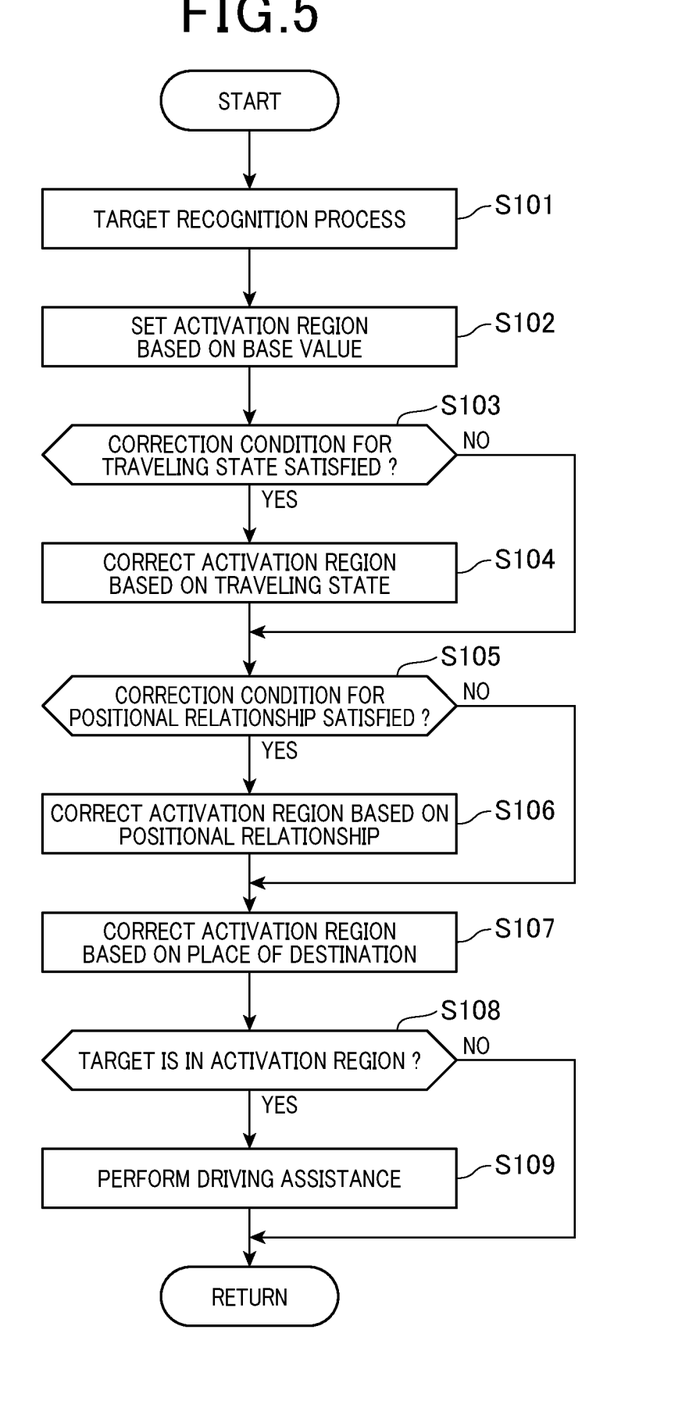
FIG. 5 is a flow diagram illustrating a process, according to the first embodiment.

FIG. 5 is a flow diagram showing a process according to the present embodiment. With reference to FIG. 5, the following description will discuss a series of processes (a series of processes performed by the vehicle control ECU 10) in which the activation region corrected as described above is set, and it is determined whether to activate the safety device. The series of processes shown in FIG. 5 are performed for each target which is located ahead of the own vehicle 40 in the traveling direction and for each function of the safety device.

First, the vehicle control ECU 10 allows the target recognition section 11 to perform a recognition process for recognizing a target to identify a target type (S101). Subsequently, the vehicle control ECU 10 allows the region setting section 13 to acquire a base value indicating the setting criterion (reference condition) for activation region of the safety device, and to set an activation region on the basis of the base value thus acquired (S102). Specifically, based on the target type recognized by the target recognition section 11 and the function of the safety device, the region setting section 13 acquires a base value corresponding to the target type and the function of the safety device. For example, in the case where the data in the memory of the vehicle control ECU 10 has the structure shown in FIG. 2, and a function to be activated of the safety device is an alarm function and the recognized target is a preceding vehicle, the region setting section 13 acquires a base value R11. Subsequently, the region setting section 13 determines whether the traveling state of the own vehicle 40 satisfies the first correction condition (correction condition based on the traveling state) (S103). Specifically, the region setting section 13 makes a determination on the basis of the result of the determination on the traveling state (result of determination of whether the own vehicle 40 is in a straight traveling state or turning state) made by the traveling state calculation section 12. Consequently, if the region setting section 13 determines that the traveling state of the own vehicle 40 satisfies the first correction condition (YES in S103), the region setting section 13 corrects the activation region on the basis of the traveling state (S104). Specifically, the region setting section 13 corrects the activation region on the basis of a correction value for correcting the lateral width and the longitudinal width (depth) of the activation region. Based on the first correction condition that has been determined to be satisfied, the region setting section 13 acquires a correction value corresponding to the first correction condition and adds the acquired correction value to the base value to thereby correct the activation region. For example, in the case where the data in the memory of the vehicle control ECU 10 has the structure shown in FIG. 2, and the function to be activated of the safety device is the alarm function and the recognized target is the preceding vehicle, the activation region is corrected with use of the first correction value A11. Similarly, the region setting section 13 determines whether a positional relationship between the own vehicle 40 and the target satisfies the second correction condition (correction condition based on the positional relationship) (S105). Specifically, the region setting section 13 makes a determination on the basis of the result of the recognition of the positional relationship (result of detection as to whether the target is detected in the rightward or leftward direction of the own vehicle 40) performed by the target recognition section 11. Consequently, if the region setting section 13 determines that the positional relationship between the own vehicle 40 and the target satisfies the second correction condition (YES in S105), the region setting section 13 corrects the activation region on the basis of the positional relationship (S106). Specifically, based on the second correction condition that has been determined to be satisfied, the region setting section 13 acquires a correction value corresponding to the second correction condition, and adds the acquired correction value to the base value (or base value corrected according to the first correction condition) to thereby correct the activation region. For example, in the case where the data in the memory of the vehicle control ECU 10 has the structure shown in FIG. 2, and the function to be activated of the safety device is the alarm function and the recognized target is the preceding vehicle, the activation region is corrected with use of the second correction value B11. If the region setting section 13 determines that the traveling state of the own vehicle 40 does not satisfy the first correction condition (NO in S103), the region setting section 13 does not perform the process of S104, and control proceeds to S105. That is, if the first correction condition is not satisfied, the region setting section 13 does not correct the activation region on the basis of the traveling state of the own vehicle 40. If the region setting section 13 determines that the positional relationship between the own vehicle 40 and the target does not satisfy the second correction condition (NO in S105), the region setting section 13 does not perform the process of S106, and control proceeds to S107. That is, if the second correction condition is not satisfied, the region setting section 13 does not correct the activation region on the basis of the positional relationship between the own vehicle 40 and the target.

The region setting section 13 corrects the activation region on the basis of the place of destination of the own vehicle 40 (S107). Specifically, the region setting section 13 corrects the activation region, based on a destination correction value for correcting the lateral width and the longitudinal width (depth) of the activation region to a value appropriate for the destination. Based on the place of destination of the own vehicle 40, the target type, and the function of the safety device, the region setting section 13 acquires a destination correction value corresponding to these items, and corrects the activation region by multiplying the destination correction value thus acquired, by the base value that has been corrected on the basis of the correction condition. For example, in the case where the data in the memory of the vehicle control ECU 10 has the structure shown in FIG. 3, and the function to be activated of the safety device is the alarm function and the recognized target is the preceding vehicle, the activation region is corrected with use of the destination correction value α11. When the activation region is set in this manner, the vehicle control ECU 10 allows the activation determination section 14 to determine whether the target is located in the activation region (S108). Consequently, if the activation determination section 14 determines that the target is located in the activation region (YES in S108), the activation determination section 14 activates the safety device and exerts a driving assistance function (S109). Specifically, the activation determination section 14 transmits the result of the determination (activation determination signal) to the control processing section 15. Based on the result of the determination thus received, the control processing section 15 transmits a control signal to the safety device to be activated. This causes the safety device to be activated. If the activation determination section 14 determines that the target is not located in the activation region (i.e. is outside the activation region) (NO in S108), the activation determination section 14 immediately terminates the series of processes. Specifically, the activation determination section 14 transmits the result of the determination (activation determination signal) to the control processing section 15. Based on the result of the determination thus received, the control processing section 15 transmits no control signal to the safety device. This causes the safety device not to be activated.

The aforementioned configuration of the vehicle control apparatus (vehicle control ECU 10) of the present embodiment brings about the following advantageous effects.

According to the vehicle control apparatus of the present embodiment, a plurality of correction conditions, such as the traveling state of the own vehicle 40 and the positional relationship between the own vehicle 40 and the target, are set for each function of the safety device and each target type. Furthermore, in the vehicle control apparatus, a correction value is set for each of the plurality of correction conditions. This allows the vehicle control apparatus of the present embodiment to finely set the activation region (activation condition) and accurately activate the safety device. When a correction value corresponding to each correction condition is set for each destination, the amount of data is increased. Thus, in the present embodiment, the correction value corresponding to each of the plurality of correction conditions is set for each target type and each function of the safety device. Furthermore, in the present embodiment, the destination correction value corresponding to the country, region, or the like where the vehicle is used is set for each target type and each function of the safely device. Thus, in the present embodiment, the activation region (base value) which is a reference condition is corrected on the basis of the correction value corresponding to each of the plurality of correction conditions, and the corrected activation region is corrected on the basis of the destination correction value corresponding to the place of destination. This allows the vehicle control apparatus of the present embodiment to finely set the activation region and prevents increase in the amount of data associated with activation of the safety device.

Depending on the place of destination, specific functions of the safety device do not have to be necessarily activated or should not be activated. Similarly, depending on the target type, specific functions of the safety device do not have to be necessarily activated or should not be activated. Thus, in the vehicle control apparatus of the present embodiment, the destination correction value is set to zero for a function not to be activated among the functions of the safety device. This allows the vehicle control apparatus of the present embodiment to easily determine the function not to be activated of the safety device.

According to the vehicle control apparatus of the present embodiment, a plurality of countries, regions, or the like having common road conditions or the like are correlated with a single place of destination. This allows the vehicle control apparatus of the present embodiment to reduce the amount of data associated with activation of the safety device.

Second Embodiment

The vehicle control apparatus of the present embodiment has an overall configuration common to the vehicle control apparatus of the first embodiment, but differs in part of processes and data structures from the vehicle control apparatus of the first embodiment.

In the present embodiment, activation timing is set for each function of the safety device, as an activation condition for activating the safety device. In this case, in the vehicle control ECU 10, the region setting section 13 functions as condition setting means and to set activation timing as an activation condition. Furthermore, in the present embodiment, based on a relative distance and relative speed (or relative acceleration) between the own vehicle 40 and the target, time to collision which is predicted time until the relative distance between the own vehicle 40 and the target becomes zero is calculated. In the present embodiment, it is then determined whether the calculated time to collision has reached the activation timing. Consequently, in the present embodiment, if it is determined that the time to collision has reached the activation timing, the function of the safety device corresponding to the activation timing is activated. Specifically, the vehicle control ECU 10 allows the region setting section 13 to function as time to collision calculation means for calculating time to collision, that is, predicted time until the own vehicle 40 collides with the target. Furthermore, the activation determination section 14 and the control processing section 15 cooperate with each other to function as activation determination means.

Figure 6:
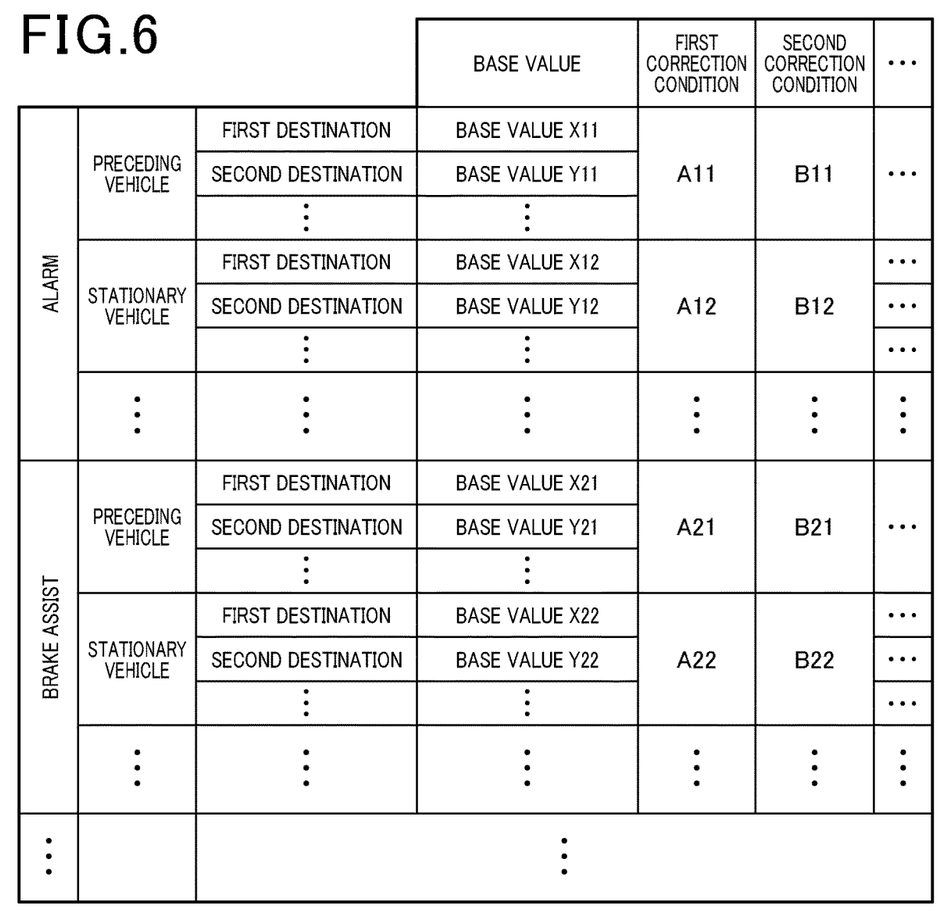
FIG. 6 is a diagram illustrating a data structure of a base value of activation timing and a correction value corresponding to a correction condition, according to a second embodiment.

FIG. 6 shows an example data structure of base value of activation timing and correction value corresponding to correction condition of the present embodiment. As shown in FIG. 6, the data includes a plurality of data items such as function of the safety device, target type, setting criterion for activation timing, and correction condition for activation timing, and is stored being correlated to each of the plurality of data items. As a data item of the setting criterion for activation timing, a base value indicating the setting criterion for activation timing (reference condition which is a criterion for activation condition) is stored. The base value is data indicating a reference value for setting activation timing. The base value is stored for each function of the safety device, and the base value of each function is stored for each type, and the base value of each type is stored for each destination. As a data item of the correction condition for activation timing, data corresponding to a plurality of correction conditions can be stored. As a data item of each of the plurality of correction conditions, a correction value corresponding to the correction condition is stored. The correction value is data for correcting the activation timing. The correction value is stored for each function of the safety device, and the correction value for each function is stored for each target type. The correction value can be a positive value or a negative value, depending on the correction condition.

The following description will discuss in detail a method (correction process performed by the region setting section 13) for correcting activation timing (activation condition). The following description will discuss an example where activation timing (activation condition) for the alarm function is corrected in the case where the place of destination of the own vehicle 40 is the first destination, the target located ahead of the own vehicle 40 in the traveling direction is a preceding vehicle, and the first and second correction conditions are satisfied. Based on the function of the safety device, the target type, and the destination, the region setting section 13 reads out first a base value X11 of the setting criterion (reference condition) for activation timing, a correction value A11 for the first correction condition, and a correction value B11 for the second correction condition which correspond to the alarm function, the preceding vehicle, and the first destination. The region setting section 13 adds the read out correction value A11 for the first correction condition and correction value B11 for the second correction condition to the base value R11. Accordingly, the region setting section 13 calculates the activation timing for the alarm function under the above conditions using the following formula (2).

$$\text{Activation timing} = (X11 + A11 + B11) \quad (2)$$

This allows the region setting section 13 to correct the reference activation timing corresponding to the function of the safety device, the target type, and the place of destination, to the activation timing suitable for the correction condition. Base values, such as the base value X11, are stored and set as correlated data (mapping data) indicating a relationship between the speed of the target relative to the own vehicle 40 and the activation timing for the function of the safety device.

Figure 7:
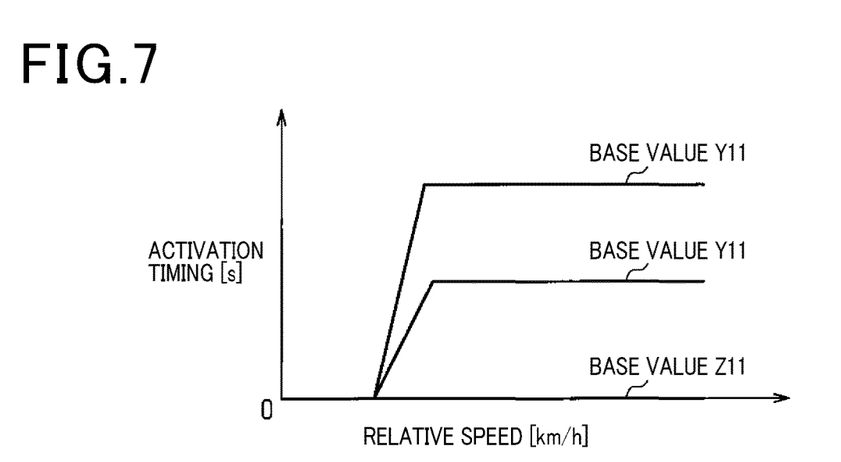
FIG. 7 is a diagram illustrating a relationship between a relative speed and an activation timing of individual base values.

FIG. 7 shows an example of a relationship between the speed of a target relative to the own vehicle 40 and the activation timing for the function of the safety device, for individual base values. As shown in FIG. 7, activation timing for each of base values X11, Y11, and Z11 is set to zero seconds (0 [s]) during the period when the relative speed does not exceed a given speed. The base values X11 and Y11 are set such that, when the relative speed exceeds the given speed, the activation timing increases proportionately with the increase of the relative speed. Further, the base values X11 and Y11 are set such that, when the relative speed subsequently becomes equal to a predetermined speed or more, the activation timing becomes constant. The activation timing for the base value Z11 is set to zero seconds regardless of a change in relative speed. That is, in the case Where the criterion of activation timing is set as the activation tuning for the base value Z11, the function to be activated of the safety device is not to be activated.

Figure 8:
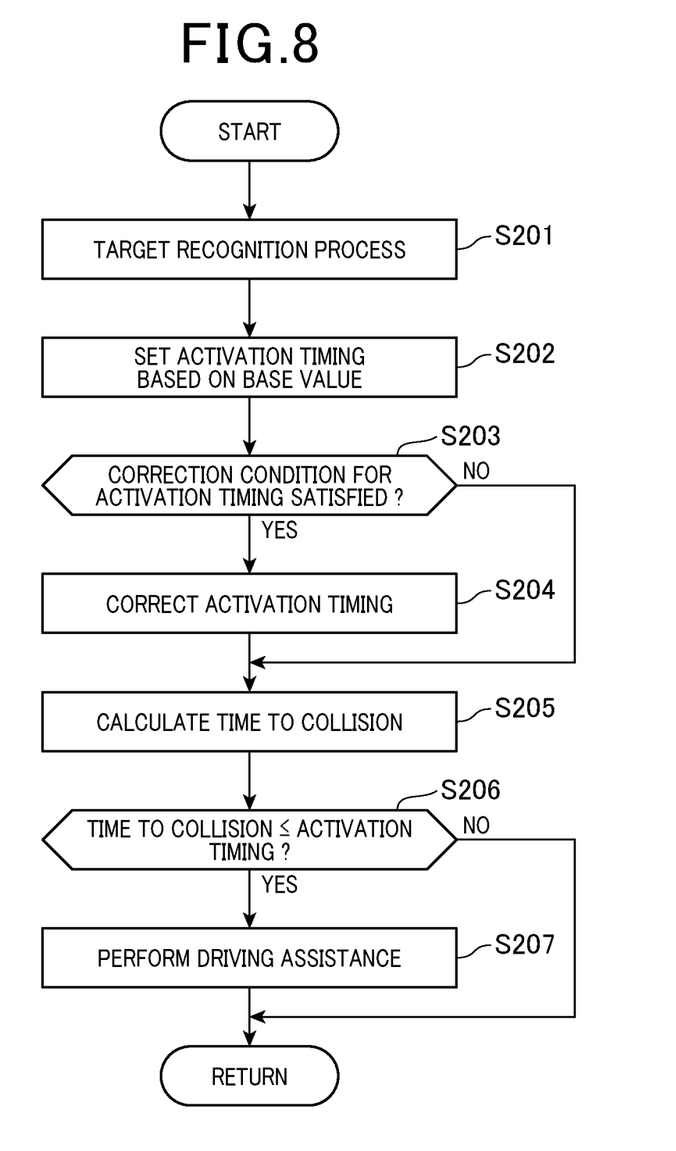
FIG. 8 is a flow diagram illustrating a process, according to the second embodiment.

FIG. 8 is a flow diagram showing a process of the present embodiment. With reference to FIG. 8, the following description will discuss a series of processes (a series of processes performed by the vehicle control ECU 10) in which the activation tuning corrected as described above is set and it is determined whether to activate the safety device. The series of processes shown in FIG. 8 are performed for each target which is located ahead of the own vehicle 40 in the traveling direction, and also for each function of the safety device.

First, the vehicle control ECU 10 allows the target recognition section 11 to perform a recognition process for recognizing a target to identify the target type (S201). Subsequently, the vehicle control ECU 10 allows the region setting section 13 to acquire a base value indicating the setting criterion of activation timing, and set activation timing on the basis of the base value thus acquired (S202). Specifically, based on the function of the safety device, the target type recognized by the target recognition section 11, and the place of destination, the region setting section 13 acquires a base value corresponding to these items. Subsequently, the region setting section 13 determines whether the own vehicle 40 satisfies the correction condition for activation timing (S203). Consequently, if the region setting section 13 determines that the own vehicle 40 satisfies the correction condition for activation timing (YES in S203), the region setting section 13 corrects the activation timing (S204). Specifically, based on the correction condition which has been determined to be satisfied, the region setting section 13 acquires a correction value corresponding to the correction condition, and adds the acquired correction value to the base value to correct the activation timing. If the region setting section 13 determines that the own vehicle 40 does not satisfy the correction condition for activation timing (NO in S203), the region setting section 13 does not perform the process of S204, and control proceeds to S205.

The region setting section 13 calculates time to collision which is predicted time until the own vehicle 40 collides with the target (S205). Specifically, the region setting section 13 calculates time to collision on the basis of the relative distance and relative speed (or relative acceleration) between the own vehicle 40 and the target, which have been detected by the target recognition section 11. The region setting section 13 determines whether the calculated time to collision is not more than the corrected activation timing (S206). Consequently, if the region setting section 13 determines that the calculated time to collision is not more than the corrected activation timing (YES in S206), the region setting section 13 determines that the time to collision has reached the activation timing, and activates the safety device and exerts a driving assistance function (S207). If the region setting section 13 determines that the time to collision is more than the corrected activation timing (NO in S206), the region setting section 13 determines that the time to collision has not reached the activation timing, and immediately terminates the series of processes.

In addition to the advantageous effects similar to those of the vehicle control apparatus of the first embodiment, the aforementioned configuration of the vehicle control apparatus (vehicle control ECU 10) of the present embodiment brings about the following advantageous effects.

According to the vehicle control apparatus of the present embodiment, the base value determining the criterion of activation timing is set for each destination. Therefore, according to the vehicle control apparatus of the present embodiment, it is not necessary to set, for each destination, a correction value corresponding to each correction condition, and the amount of data can be reduced.

Third Embodiment

In the first embodiment, the activation region (activation condition) having the lateral width based on the rightward limit value XR and the leftward limit value XL has been set ahead of the own vehicle 40 in the traveling direction. Further, in the first embodiment, whether there is a probability that the own vehicle 40 will collide with the target has been determined based on the determination as to whether the target is located in the activation region. In this regard, in the present embodiment, a movement path of a target is predicted, and based on the result of the prediction, a collision lateral position which is a position at which the target is predicted to collide with the own vehicle 40 is calculated. In this case, the vehicle control ECU 10 allows the activation determination section 14 to function as collision lateral position calculation means for calculating a collision lateral position which is a position at which the target is predicted to collide with the own vehicle 40, based on the result of the prediction for the movement path of the target. In the present embodiment, it is then determined whether the collision lateral position thus calculated falls in a range of the lateral width (in the activation region) based on the rightward limit value XR and the leftward limit value XL. In the present embodiment, it is thus determined whether there is a probability that the own vehicle 40 will collide with the target.

Figure 9:
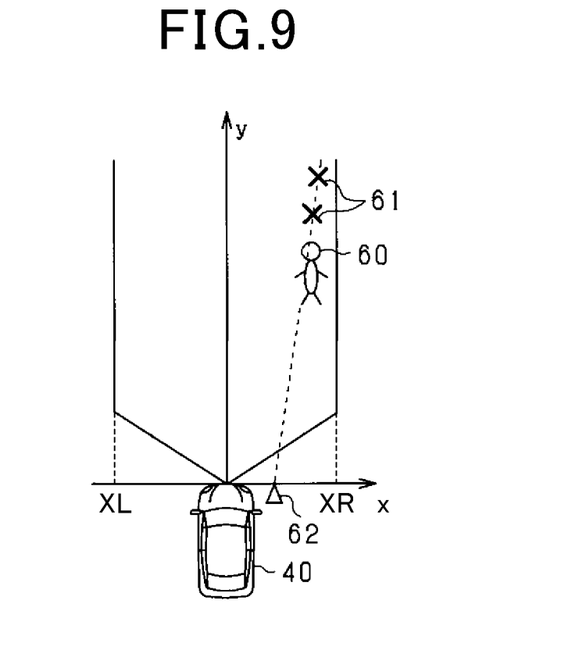
FIG. 9 is a diagram illustrating a collision lateral position, according to a third embodiment.

FIG. 9 is a diagram illustrating a collision lateral position 62 according to the present embodiment. With reference to FIG. 9, the following description will discuss a determination process (determination process for determining a probability of collision of the own vehicle 40) which is performed by the activation determination section 14 of the present embodiment. The rightward limit value XR and the leftward limit value XL are similar to those of the first embodiment, and thus, descriptions of these values will be omitted. The vehicle control ECU 10 of the present embodiment stores detected previous positions 61 (longitudinal position and lateral position) of the target 60 over a predetermined time period, and records the previous positions 61 as a position history of the target 60. The activation determination section 14 estimates a movement path of the target 60 on the basis of the previous positions 61 of the target 60 which have been recorded as the position history, and a current position of the target 60. Then, assuming that the target 60 moves along the estimated movement path, the activation determination section 14 calculates a lateral position of a point where the longitudinal position between the front end of the own vehicle 40 and the target 60 is zero, as the collision lateral position 62.

The activation determination section 14 compares the calculated collision lateral position 62 with the rightward limit value XR and the leftward limit value XL which define the range of the lateral width. Consequently, if the collision lateral position 62 is located in the range of the lateral width of the activation region based on the rightward limit value XR and the leftward limit value XL, the activation determination section 14 determines that there is a probability that the own vehicle 40 will collide with the target 60.

Even in the case Where the target 60 is located in the rightward direction of the own vehicle 40, the calculated collision lateral position 62 may be calculated as being at a position in the leftward direction of the own vehicle 40, depending on the result of the estimation of the movement path of the target 60. In the present embodiment, therefore, the correction condition (second correction condition) based on the positional relationship between the own vehicle 40 and the target 60 may be taken o be a correction condition based on the position of the collision lateral position 62.

In the present embodiment, as with the first embodiment, an activation region having a depth L may be set, and it may be determined whether the target 60 predicted to collide with the own vehicle 40 is located in the set activation region. Furthermore, in the present embodiment, as with the second embodiment, the activation timing may be compared with the time to collision to make a determination on the basis of the result of the comparison.

The aforementioned configuration of the vehicle control apparatus (vehicle control ECU 10) of the present embodiment brings about advantageous effects equivalent to those of the vehicle control apparatus of the first embodiment.

Fourth Embodiment

The vehicle control apparatus of the present embodiment has an overall configuration common to the vehicle control apparatus of the second embodiment, but differs in part of processes from the vehicle control apparatus of the second embodiment.

Figure 10:
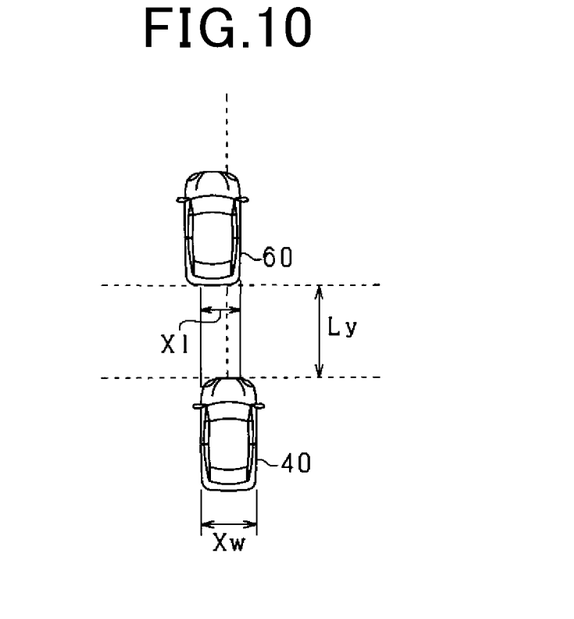
FIG. 10 is a diagram illustrating an overlap ratio, according to a fourth embodiment.

In the second embodiment, the base value of the activation timing for the function of the safety device is set (as mapping data) being correlated the relative speed between the own vehicle 40 and the target 60. In this regard, in the present embodiment, in the case where the target 60 is a preceding vehicle traveling ahead of the own vehicle 40 in the same traveling direction as the own vehicle 40, the region selling section 13 of the vehicle control ECU 10 sets a base value of the activation timing, being correlated with an overlap ratio La between the own vehicle 40 and the preceding vehicle. The overlap ratio La herein refers to a value indicating the rate of overlap between the width the own vehicle 40 and the width of the preceding vehicle as the target 60. FIG. 10 is a diagram illustrating the overlap ratio La according to the present embodiment. With reference to FIG. 10, the following description will discuss the overlap ratio La of the present embodiment. For example, Xw represents the width of the own vehicle 40 and Xl represents the width of a region of an overlap between the width of the own vehicle 40 and the width of the preceding vehicle as the target 60. In this case, the region setting section 13 calculates the overlap ratio La by the following formula (3) below.

$$La = Xl/Xw \qquad (3)$$

As illustrated in FIG. 10, for example, when braking is suddenly applied by the preceding vehicle as the target 60, a greater overlap ratio La and a shorter relative distance Ly (a greater overlap ratio between the width of the own vehicle 40 and the width of the preceding vehicle as the target 60) will make it more difficult to avoid a collision is more. When braking is suddenly applied by the preceding vehicle as the target 60, a smaller overlap ratio La and a longer relative distance Ly will make it easier o avoid a collision. Thus, the region setting section 13 sets the base value of the activation timing so as to be smaller (so as to delay the activation timing) as the overlap ratio La is smaller (or as the overlap ratio La is smaller and the relative distance Ly is longer). Furthermore, the region setting section 13 sets the base value of the activation timing so as to be larger (so as to advance the activation timing) as the overlap ratio La is greater as the overlap ratio La is greater and the relative distance Ly is shorter).

The aforementioned configuration of the vehicle control apparatus (vehicle control ECU 10) of the present embodiment brings about advantageous effects equivalent to those of the vehicle control apparatus according to the second embodiment.

Modified Examples

In the first embodiment, the correction value for the satisfied correction condition is added to the base value that is the setting criterion for activation region (reference condition for activation condition), and the base value after addition is multiplied by the destination correction value suitable for the place of destination. Thus, according to the first embodiment, the activation region of the safety device is corrected and set ahead of the own vehicle 40 in the traveling direction, but the configuration is not limited to this. For example, as with the second embodiment, a base value may be set for each destination and the base value suitable for each destination may be corrected on the basis of the correction condition.

In the second embodiment, the base value of the activation timing for the safety device is set for each destination, but the configuration is not limited to this. For example, as with the first embodiment, an activation timing appropriate for the place of destination may be calculated by correcting a base value on the basis of the correction condition and correcting the corrected base value so as to be suitable for the place of destination.

In the first embodiment, the lateral width and the longitudinal width (depth) of the activation region is set ahead of the own vehicle 40 in the traveling direction, and the safety device is activated on the basis of the result of the determination as to whether the target 60 is located in the set activation region, but the configuration is not limited to this. For example, as with the second embodiment, activation timing may be calculated for the safety device, and the calculated activation timing may be used as a basis for activating the safety device.

In the second embodiment, the activation timing for the safety device is corrected and set to a value appropriate for the place of destination, but the configuration is not limited to this. For example, as with the first embodiment, the rightward limit value XR and the leftward limit value XL may be set, and may each be corrected to a value appropriate for the place of destination.

In the second embodiment, the base value of the activation timing for the safety device is set, being correlated with the relative speed between the own vehicle 40 and the target 60. In the fourth embodiment, the base value of the activation timing is set being correlated with the overlap ratio La between the own vehicle 40 and the target 60. Alternative to this, the base value of the activation timing may be set being correlated with the lateral position of the target 60 that is a position relative to the direction (lateral direction) orthogonal to the traveling direction of the own vehicle 40. In this case, as the lateral position of the target 60 is more distanced from the traveling direction of the own vehicle 40, collision is avoided easier. Thus, the base value of the activation timing may be set such that as the lateral position of the target 60 is more distanced from the traveling direction of the own vehicle 40, the base value becomes smaller, so that the safety device is activated at a later stage.

In the second embodiment, the base value of the activation timing for the safety device is set being correlated with the relative speed between the own vehicle 40 and the target 60. In the fourth embodiment, the base value of the activation timing is being correlated with the overlap ratio La between the own vehicle 40 and the target 60. Alternative to this, the base value of the activation timing may be set being correlated with the relative speed and the overlap ratio La. Alternatively, the base value of the activation timing may be set being correlated with the aforementioned lateral position of the target 60 (position relative to the lateral direction of the own vehicle 40). In this case, as the lateral position of the target 60 becomes closer to the center axis in the traveling direction of the own vehicle 40, avoidance of a collision is more difficult. Thus, the base value of the activation timing may be set such that as the lateral position of the target 60 becomes closer to the center axis in the traveling direction of the own vehicle 40, the base value becomes larger, so that the safety device is activated at an earlier stage.

In the first embodiment, it is determined that there is a probability that the own vehicle 40 will collide with the target 60, based on the result of the determination as to whether the position (relative position including the lateral position and the longitudinal position) of the detected target 60 is present in the set activation region. In the third embodiment, the collision lateral position 62 of the point where the longitudinal position between the front end of the own vehicle 40 and the target 60 is zero is calculated, and based on the calculated collision lateral position 62, it is determined that there is a probability that the own vehicle 40 will collide with the target 60. Alternative to this, the process described in the first embodiment (hereinafter referred to as "determination process based on the relative position of the target 60") may be ensured to be performed in parallel with the process described in the third embodiment (hereinafter referred to as "determination process based on the collision lateral position 62"). In this case, setting values for the base values used as the rightward limit value XR and the leftward limit value XL may be different between the determination process based on the relative position of the target 60 and the determination process based on the collision lateral position 62. That is, the data shown in FIGS. 3 and 4 can be set for each of these determination processes.

In the aforementioned embodiments, the vehicle control apparatus is represented by a vehicle control system that avoids a collision of the own vehicle 40 with the target 60 present ahead of the own vehicle 40. However, the vehicle control apparatus of the present disclosure is not limited to this. The vehicle control apparatus of the present disclosure is applicable to, for example, a vehicle control system which detects a target 60 located behind of the own vehicle 40 and avoids a collision of the own vehicle 40 with the detected target 60. The vehicle control apparatus of the present disclosure is applicable to a vehicle control system which avoids a collision of the own vehicle 40 with a target 60 approaching the own vehicle 40. Note that the phrase "the traveling direction" which has been used in the descriptions of the aforementioned embodiments, means "ahead of the own vehicle 40," when the own vehicle 40 is traveling forward. Further, when the own vehicle 40 is traveling backward, the phrase means " to the rear of the own vehicle 40."

In the aforementioned embodiments, the notification device 31 and the brake device 32 are mentioned as the safety device. However, the safety device connectable to the vehicle control apparatus of the present disclosure is not limited to these devices. For example, a collision may be avoided by controlling a steering device.

The own vehicle 40 equipped with the vehicle control apparatus of the present disclosure is not limited to a vehicle driven by a person who is in the vehicle. The vehicle control apparatus of the present disclosure is similarly applicable to, for example, a vehicle automatically driven by an ECU or the like.

REFERENCE SIGNS LIST

10 . . . Vehicle control ECU, 11 . . . Target recognition section, 12 . . . Traveling state calculation section, 13 . . . Region setting section, 14 . . . Activation determination section, 15 . . . Control processing section.

The invention claimed is:

1. A vehicle control apparatus which activates a safety device for avoiding a collision of an own vehicle with a target that is present around the own vehicle or reducing damage caused by the collision, in a case where there is a probability that the own vehicle will collide with the target, the vehicle control apparatus comprising:
  a condition setting means for setting an activation condition for activating the safety device;
  a correction determination means for determining whether each of a plurality of correction conditions for the activation condition is satisfied; and
  an activation determination means for determining whether to activate the safety device, based on the activation condition, wherein:
  the condition setting means sets the activation condition by:
    (1) correcting a reference condition, which is predetermined, based on a correction value for a correction condition which has been determined by the correction determination means as being satisfied, and
    (2) correcting the reference condition corrected by (1) based on of a destination correction value determined for each destination corresponding to a country or region where the own vehicle is used,
  wherein the destination correction value is a predetermined coefficient, and
  wherein the correcting of the reference condition corrected by (1) based on a destination correction value comprises multiplying the reference condition corrected by (1) by a coefficient specific to each destination.

2. The vehicle control apparatus according to claim 1, comprising:
  a type determination means for determining a target type, wherein:
  the destination correction value is set for each target type determined by the type determination means, and the destination correction value for each type is set for each destination.

3. The vehicle control apparatus according to claim 1, wherein:
  the safety device has a plurality of functions; and
  the destination correction value is set for each of the plurality of functions, and the destination correction value for each of the plurality of functions is set for each destination.

4. The vehicle control apparatus according to claim 1, wherein:
  the destination correction value is the predetermined coefficient by which the reference condition corrected according to the correction condition is multiplied; and
  in a case where the safety device is not to be activated, the destination correction value is set to zero.

5. The vehicle control apparatus according to claim 1, wherein:
  the condition setting means sets a determination region having a width, that is predetermined, ahead of the own vehicle in a traveling direction, as the activation condition; and
  the activation determination means activates the safety device on condition that the target is located in the determination region.

6. The vehicle control apparatus according to claim 5, wherein in a case where one of the plurality of correction conditions is satisfied, the condition setting means changes a setting of the activation condition by correcting the width of the determination region based on the one of the plurality of correction conditions that satisfied.

7. The vehicle control apparatus according to claim 1, wherein:
  the condition setting means sets activation timing for activating the safety device, as the activation condition; and
  the activation determination means activates the safety device based on a position of the target relative to the own vehicle, and the activation timing.

8. The vehicle control apparatus according to claim 7, wherein in a case where one of the plurality of correction conditions is satisfied, the condition setting means changes a setting of the activation condition by correcting the activation timing based on the satisfied correction conditions.

9. The vehicle control apparatus according to claim 1, wherein the correction condition includes at least one of a condition based on a traveling state of the own vehicle and a condition based on a positional relationship between the own vehicle and the target.

10. The vehicle control apparatus according to claim 1, wherein the correction condition includes at least one of a condition based on a traveling state of the own vehicle and a condition based on a positional relationship between the own vehicle and the target.

11. The vehicle control apparatus of claim 1, wherein the destination correction value is set to zero to ensure that the safety device is not activated in the respective destination.

12. A vehicle control method performed by a vehicle control apparatus that activates a safety device for avoiding a collision of an own vehicle with a target present around the own vehicle or reducing damage caused by the collision, in a case where there is a probability that the own vehicle will collide with the target, wherein the vehicle control apparatus performs:
  a condition setting step of setting an activation condition for activating the safety device;
  a correction determination step of determining whether each of a plurality of correction conditions for the activation condition is satisfied; and
  an activation determination step of determining whether to activate the safety device based on the activation condition, wherein in the condition setting step, the activation condition is set by:
(1) correcting a reference condition, which is predetermined, based on a correction value for the correction condition that has been determined to be satisfied in the correction determination step, and
(2) correcting the reference condition corrected by (1) based on a destination correction value, the destination correction value being determined for each destination corresponding to a country or region where the own vehicle is used,
wherein the destination correction value is a predetermined coefficient, and
wherein correcting the reference condition corrected by (1) based on a destination correction value comprises multiplying the reference condition corrected by (1) by a coefficient specific to each destination.

13. A vehicle control apparatus which activates a safety device for avoiding a collision of an own vehicle with a target that is present around the own vehicle or reducing damage caused by the collision, in a case where there is a probability that the own vehicle will collide with the target, the vehicle control apparatus comprising:
a memory;
a processor communicable to the memory; and
a set of computer-executable instructions stored on the memory that cause the processor to implement:
setting an activation condition for activating the safety device;
determining whether each of a plurality of correction conditions for the activation condition is satisfied; and
determining whether to activate the safety device, based activation condition, wherein:
the processor sets the activation condition by:
(1) correcting a reference condition, which is predetermined, based on a correction value for a correction condition which has been determined as being satisfied, and
(2) correcting the reference condition corrected by (1) based on a destination correction value determined for each destination corresponding to a country or region where the own vehicle is used,
wherein the destination correction value is a predetermined coefficient, and
wherein correcting the reference condition corrected by (1) based on a destination correction value comprises multiplying the reference condition corrected by (1) by a coefficient specific to each destination.

* * * * *